United States Patent
Hojsgaard et al.

(10) Patent No.: US 6,966,989 B2
(45) Date of Patent: Nov. 22, 2005

(54) METHOD AND INSTALLATION FOR THE THERMAL HYDROLYSIS OF SLUDGE

(75) Inventors: Soren J. Hojsgaard, Hillerod (DK); Jean-Christian Blagaard, KBH.O (DK); Genevieve Boissonnade, Paris (FR)

(73) Assignee: OTV S.A. (FR)

( * ) Notice: Subject to any disclaimer, the term of this patent is extended or adjusted under 35 U.S.C. 154(b) by 0 days.

(21) Appl. No.: 10/468,170

(22) PCT Filed: Feb. 14, 2002

(86) PCT No.: PCT/FR02/00577

§ 371 (c)(1),
(2), (4) Date: Aug. 14, 2003

(87) PCT Pub. No.: WO02/064516

PCT Pub. Date: Aug. 22, 2002

(65) Prior Publication Data

US 2004/0060863 A1 Apr. 1, 2004

(30) Foreign Application Priority Data

Feb. 14, 2001 (FR) .............................................. 01 02038

(51) Int. Cl.⁷ ............................ C02F 11/18; C02F 11/04
(52) U.S. Cl. ........................ 210/603; 210/613; 210/620
(58) Field of Search ................................ 210/603, 749, 210/761, 766, 175, 780, 253, 613, 620, 765, 180

(56) References Cited

U.S. PATENT DOCUMENTS

| | | | |
|---|---|---|---|
| 4,017,421 A | | 4/1977 | Othmer |
| 4,203,838 A | * | 5/1980 | Shimizu et al. ............. 210/603 |
| 4,261,836 A | * | 4/1981 | Koglin ...................... 210/737 |
| 5,188,740 A | | 2/1993 | Khan |
| 5,785,852 A | | 7/1998 | Rivard et al. |
| 6,521,133 B1 | * | 2/2003 | Roediger .................... 210/742 |

* cited by examiner

*Primary Examiner*—Fred G. Prince
(74) *Attorney, Agent, or Firm*—Coats & Bennett, P.L.L.C.

(57) ABSTRACT

The invention relates to a method for the thermal hydrolysis of sludge characterized in that it is carried out in at least two reactors operating in parallel, in each of which the sludge undergoes a complete thermal hydrolysis cycle. Said cycle comprises different stages consisting in supplying the reactor with the sludge, injecting live stream in order to bring said sludge to a pressure P and a temperature T at which hydrolysis can occur, maintaining the sludge at said pressure P and said temperature T for a certain amount of time, suddenly bringing said sludge to the atmospheric pressure by releasing the flash steam and emptying said reactor of the hydrolysed sludge. Furthermore, the inventive method consists in time shifting the cycle of one reactor to the other in order to use the flash steam produced from one reactor to inject it into the other reactor.

21 Claims, 2 Drawing Sheets

METHOD AND INSTALLATION FOR THE THERMAL HYDROLYSIS OF SLUDGE

This application is a U.S. National Stage application of PCT Application No. PCT/FR02/00577, with an international filing date of Feb. 14, 2002. Applicant claims priority based on French application serial no. 01 02038 filed Feb. 14, 2001.

This invention concerns the field of treatment of sludge which is heavily loaded with fermentable organic material and especially sludge originating from decontamination processes of urban or industrial waste water, production processes for potable water from surface or subterranean water, or even sludge originating from sewerage mains cleaning operations.

Currently, part of the sludge produced by purification stations is improved in the agricultural industry, whereas another part is stored in overflow. Since production of this sludge is becoming more and more important, it is necessary for the latter not to present any risk to the environment and human health. In fact, this sludge contains germs whereof certain are pathogens (coliform, salmonella bacteria, helminth eggs, ... ). Also, they are highly fermentable and are the basis of gas production (amines, hydrogen sulphide, mercaptans) which cause olfactive pollution.

These considerations explain the necessity of using, on the abovementioned products for treatment, at least one stabilisation stage for sludge creating a sludge which no longer evolves, or at the least, evolving slowly, as much on the biological scale as on the physico-chemical scale. Another preoccupation is the willingness to reduce the volume of this sludge.

Different processes have been proposed in the prior art for treating this sludge. These processes can be classed essentially as follows:
   aerobic digestion,
   anaerobic digestion,
   chemical processing,
   thermal processing.

It is the last type of treatment to which this invention relates.

Thermal hydrolysis of sludge consists of treating it at high temperature under pressure so as to hygienise it (that is to very strongly break down their micro-organism content) and to transform the organic matter which it contains into soluble biodegradable DCO (alcohols, aldehydes, volatile fatty acids).

The oldest technique of thermal hydrolysis of sludge was made available by Portheous at the beginning of the century. According to this technique, which makes use of a certain number of reactors under pressure, functioning in sequence, the sludge is pumped into a first reactor wherein steam produced by a boiler is injected until temperature of around 180° C. is reached for a pressure of 15 bar. The temperature is then maintained for 30 minutes, then the sludge is evacuated under its own pressure via a heat exchanger. This heat exchanger is utilised to recuperate the heat of the sludge exiting from the reactor and to reheat the sludge to be treated entering a second reactor.

This process does, however, have the disadvantage of being discontinuous and yielding low productivity.

In the fifties, FARRER put forward a continuous and automatic process of thermal hydrolysis of sludge. According to this process, the thick sludge undergo disintegration, before being pumped under pressure (20 to 35 bar) to then be introduced into a so-called primary exchanger which has a double purpose: preheating the incoming sludge to around 180° C., and cooling the sludge leaving the thermal treatment. The preheated sludge then passes into a second heat exchanger where it is brought to a temperature higher than 200° C. The calorific contribution is cause by hot water produced by a boiler. The sludge is then conveyed to the reactor itself where treatment takes place over a given time and at a given temperature. The sludge is then returned to the primary exchanger. At the end of the cycle the sludge is brought to atmospheric pressure by a discharge system.

This type of process has the disadvantage of generating nauseous odours, requiring the use of materials which quickly foul and thus implies considerable maintenance. In addition, considerable capital is required and is reserved for major installations capable of arranging flow chains between 20 and 50 $m^3/h$ to ensure continuous discharge of the sludge and, accordingly, to prevent the destructive phenomenon of cavitation and construct large-scale specially profiled passage exchanges.

WO 96/09882 describes a process functioning in batch and utilising four reactors installed in series. According to this discontinuous process, the sludge is pumped into the different reactors, whereof the first three are heated, where it is treated. The sludge from the third reactor, heated by injection of live steam, and optionally from the fourth reactor, is relieved of pressure suddenly (flash) to produce the flash steam. The flash steam coming from the third reactor is sent on to the second reactor. The flash steam coming form the fourth reactor is sent on to the first reactor.

The disadvantage of this technique is being able to function only discontinuously, that is, being able to treat only successive lots of sludge. The production of live steam necessary for implementing this technique also cannot be continuous. The sludge passes through all the reactors during treatment. This implies the utilisation of materials such as valves, subjected to difficult operating conditions.

The object of the present invention is to propose a novel process for treatment by thermal hydrolysis of sludge which does not have the disadvantages of the prior art.

In particular, an object of the present invention is to describe such a process capable of implementing production and continuous use of live steam.

Yet another object of the present invention is to divulge the type of process which also enables continuous treatment of the sludge.

Another object of the present invention is to carry out the essential function of the reactions concerning a lot of sludge in a single reactor so as to minimise the transfer of sludge.

An object of the present invention is also to enable thermal treatment of previously dehydrated sludge.

Also, an object of the present invention is to propose an installation for implementing such a process.

These different objects, along with others which will emerge hereinbelow, are attained due to the invention which relates to a process for thermal hydrolysis of sludge, characterised in that it is fed into at least two reactors functioning in parallel in each of which the sludge undergoes a complete cycle of thermal hydrolysis, said cycle comprising the steps consisting of supplying-said sludge to said reactor, injecting live steam to bring it to a pressure P and a temperature T allowing hydrolysis, maintaining it at said pressure P and at said temperature T for a certain time, suddenly bringing said sludge to atmospheric pressure by releasing the flash steam, and emptying said reactor of said hydrolysed sludge, and in that it consists of shifting said cycle in time from one reactor to the other to utilise the flash steam produced from a reactor to inject it into the other reactor.

Such a process has the advantage of implementing a complete hydrolysis cycle of the sludge in each reactor and, by using at least two reactors whose operating cycle is shifted, benefiting from the flash steam produced in one of the reactors for supplying the other reactor with steam.

By obviating the necessity of transmitting the sludge from one reactor to the other to carry out the different steps of thermal hydrolysis, the process simplifies the installations necessary for putting the process to use, diminish the fouling rate of these installations, and minimise the odours produced as the sludge passes from one reactor to the other.

According to a preferred variant of the invention, the process proposed is carried out in at least three reactors functioning in parallel.

In this case, the live steam is injected continuously alternatively in said three reactors.

Such an aspect of the process allows the live steam to be produced from a boiler continuously, without the concern of distributing the steam discontinuously.

Shifting the cycles starts of thermal hydrolysis from one reactor to the other will be more or less long.

Nevertheless, according to an interesting variant of the process, said shifting will be calculated such that the process comprises three phases a first phase wherein:
sludge is fed to a first reactor and flash steam coming from a third reactor is injected into said first reactor,
live steam is injected into a second reactor containing sludge,
a third reactor containing sludge is kept at hydrolysis temperature and pressure then relieved of pressure, with the released flash steam being fed to said first reactor, just before being emptied;

a second phase wherein:
live steam is injected into said first reactor,
the second reactor is kept at hydrolysis temperature and pressure then relieved of pressure, with the released flash steam being fed inside said third reactor, just before being emptied,
sludge is supplied to said third reactor and flash steam coming from the second reactor is injected into said third reactor;

a third phase wherein:
the first reactor is maintained at hydrolysis temperature and pressure then brought to the relieved pressure, the released flash steam being fed to said second reactor, just before being emptied,
sludge is supplied to said second reactor and flash steam coming from the first reactor is injected into said second reactor,
live steam is injected into said third reactor.

According to this variant of the process, the live steam can be generated continuously and distributed alternatively in the first, second and third reactors. The utilization of the flash steam produced by a sudden drop in the contents of the reactors is optimized. Such continuous supply uses a boiler of simple design and a set of slow-release valves for in turn distributing the steam produced in the boiler for supply.

According to another interesting variant of the invention, the process is put to use in more than three reactors functioning in parallel with adapted cycle times so that the live steam can be injected continuously alternatively into said reactors, the sludge being injected continuously alternatively into the reactors and extracted continuously alternatively from the reactors.

Such a variant combines the advantages resulting from the continuous feed of live steam and the continuous feed of the sludge to be treated.

The temperature and the pressure used inside the reactors to drive the thermal hydrolysis of the sludge may vary. Preferably, this pressure is between 10 bar 20 bar and this temperature is between 130° C. and 200 ° C.

The duration of the complete cycles of thermal hydrolysis in each reactor can vary in particular according to the nature of the sludge and the intensity of the treatment it is to undergo. Each cycle combines the steps of:
feeding a reactor with sludge;
injecting flash steam;
injecting live steam;
retention;
pressure reduction; and,
evacuation of the sludge from the reactor.

According to a preferred variant, the duration of each cycle is between 100 nm and 360 nm. In a most preferred way, the duration of this cycle will be between around 150 nm and around 160 nm when three reactors are used.

The shifting in time of the hydrolysis cycle from one reactor to the other can also vary. It will be preferably selected to allow Continuous feed of the steam successively into the reactors.

According to another particularly interesting aspect of the invention, the proposed process preferably comprises a mesophilic on thermophilic digestion step of the hydrolysed sludge resulting in the production of biogas, said biogas being used to generate at least part of the live steam necessary for thermal hydrolysis carried into effect in said at least two reactors functioning in parallel. The digestion step can also be thermophilic aerobic.

Such a combination of the process with mesophilic or thermophilic digestion can boost yields of the digestion step, and reduce emissions of nauseating odours, and optimize the production of biogas. This combination also helps reduce the quantity of residual sludge and obtain sludge which is perfectly stabilized and hygienised.

According to a variant of the process, said digestion step is coupled with thermal hydrolysis, the sludge generated by said digestion being mixed, in all or part, with the excess sludge and hydrolysed again. Such coupling achieves major mineralization of the sludge and thus considerably reduces its volume.

Also, according to a preferred variant of the invention, the process comprises a step consisting of thermocompressing said flash steam by said live steam and thus optimizing the cycle time of hydrolysis bt performing the heating phase in one step instead of two.

The digested sludge can also, at least in part, be incinerated or oxidised via humidity.

The invention also relates to an installation for implementing the process described hereinabove, characterised in that it comprises at least two hydrolysis reactors mounted in parallel, means for supplying sludge to be hydrolysed in each of said reactors, means for evacuating hydrolysed sludge from each of said reactors, means for injecting the live steam alternatively into each of said reactors and means for conveying the flash steam coming from each reactor to the other reactor.

Preferably, said installation also includes at least one digester.

According to a variant the installation also comprises incineration means or humid oxidation means of all or part of the digested sludge.

The invention, as well as the different advantages it brings, will be better understood from the following description of an embodiment of the invention given by way of reference to the diagrams, in which FIG. 1 illustrates a first embodiment of an installation for utilising the process according to the present invention;

Figure 1:
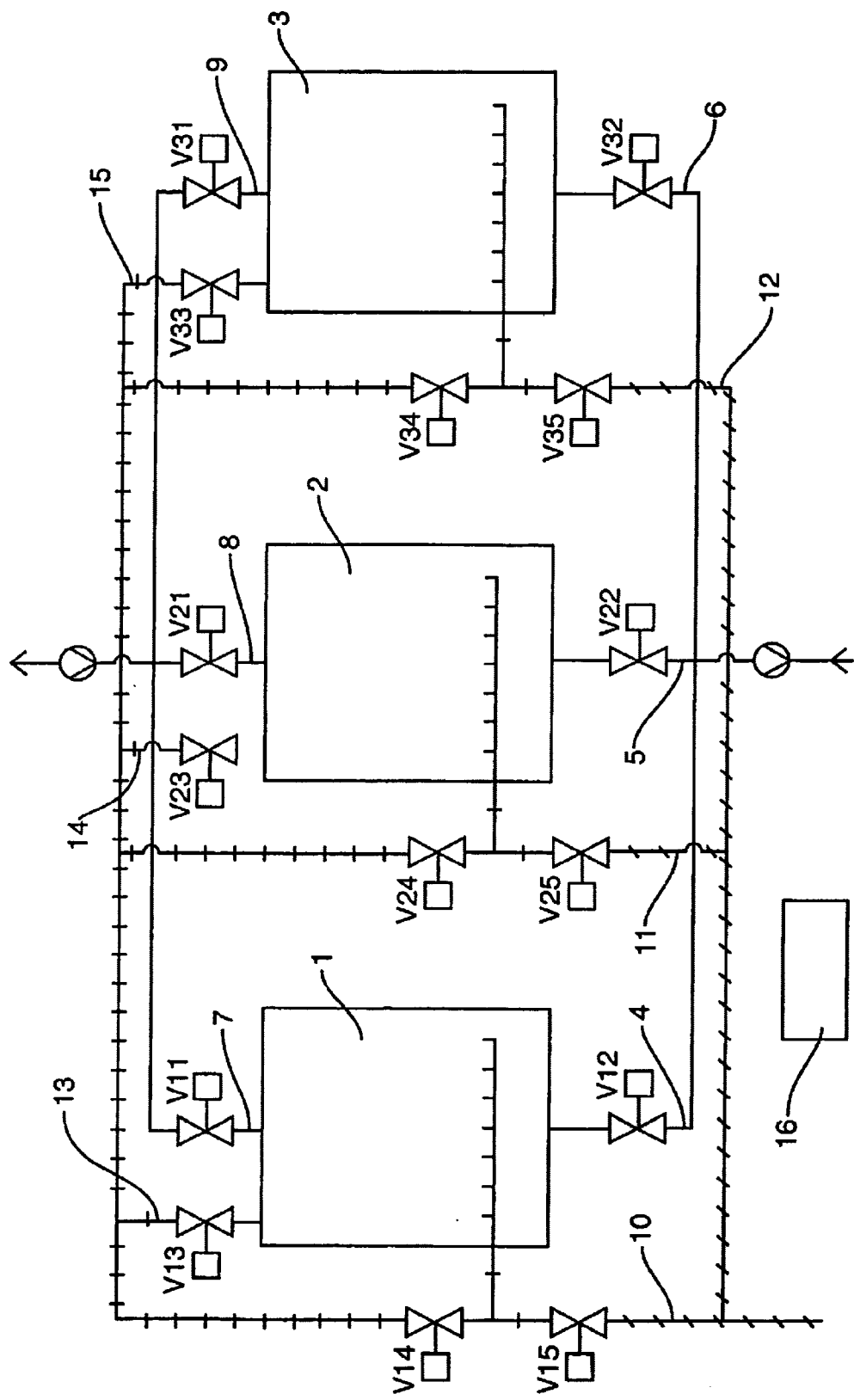

With reference to FIG. 1, the installation illustrated comprises three hydrolysis reactors 1, 2, 3, mounted in parallel. Each reactor 1, 2, 3 is provided with means for conveying sludge, respectively 4, 5, 6 to be hydrolysed and means for evacuation of the sludge, respectively 7, 8, 9.

The installation also comprises injection means 10, 11, 12, for injecting the live steam alternatively in each of said reactors 1, 2, 3 and routing means 13, 14, 15 for the flash steam coming from each reactor 1, 2, 3 to the other reactor. The means for injecting live steam are connected to a boiler (not illustrated here).

Feeding the reactors with sludge to be treated, directing live steam, injecting flash steam, and emptying the reactors, alternatively in each reactor is organised by a control element 16 linked especially to all the valves of the plant (for the sake of clarity of FIG. 1, these links are not shown).

The operation of the installation shown in FIG. 1 will now be explained with reference to FIG. 2.

Each thermal hydrolysis cycle is completed over a period of 160 nm (2 h40) and comprises the following steps of:

feeding a reactor with sludge: 15 nm injecting flash steam coming from another reactor: 20 nm injecting live steam: 60 nm retention: 30 nm pressure release resulting in production of flash steam: 20 nm emptying: 15 nm.

Figure 2:
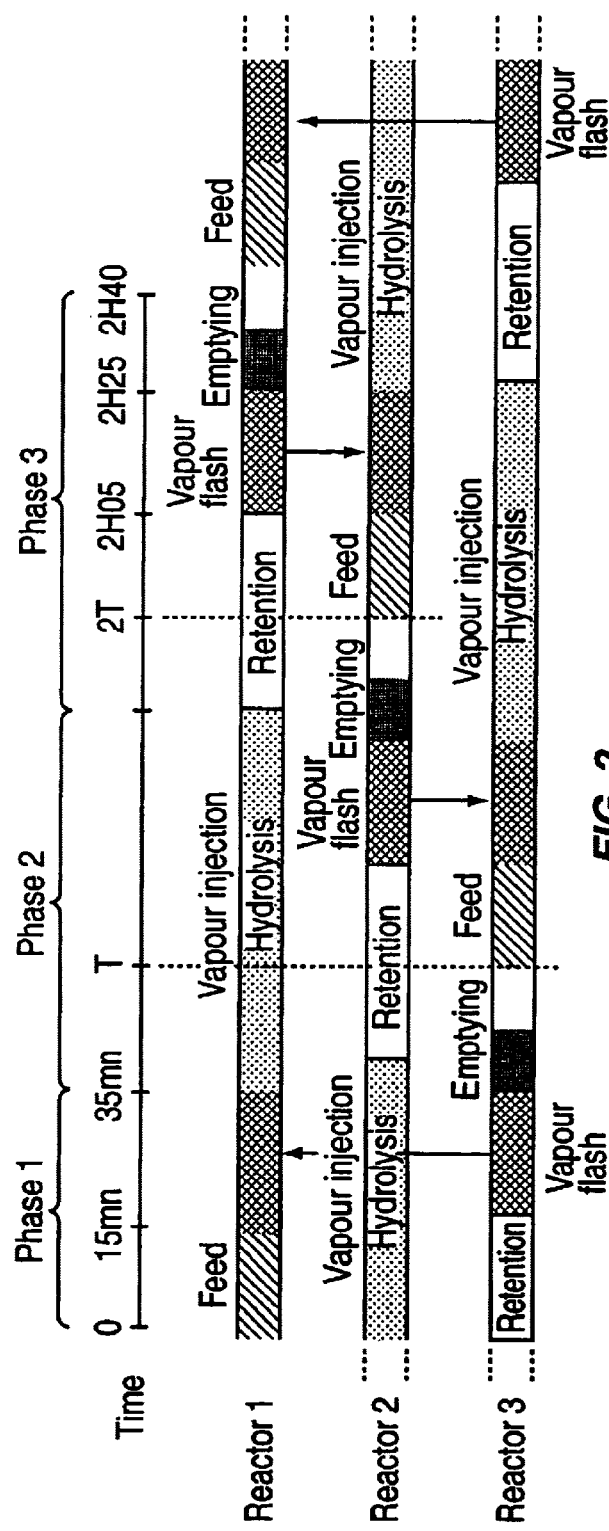
FIG. 2 illustrates a block diagram of the operation of the installation illustrated in FIG. 1.

The accumulated times relative to these different steps are indicated for the reactor 1 in FIG. 2 (these times are given indicatively only).

Three operating phases of the installation can be observed, each of these phases being symbolised in FIG. 2 by double braces.

During the first phase (phase 1), the reactor 1 is fed with sludge to be treated, and flash steam coming from the reactor 3 (for which the thermal hydrolysis cycle has already commenced, as indicated by the horizontal dotted lines) is injected therein. During this phase 1 the live steam coming from the boiler is injected into the reactor 2 (for which the thermal hydrolysis cycle has already commenced, as indicated by the horizontal dotted lines). In the third reactor the retention step takes place and the pressure inside the reactor is rapidly brought down to the reduced pressure to obtain the flash steam which, as already indicated, is redirected to the reactor 1. The first phase lasts 35 nm.

In the course of the second phase the live steam is injected into the reactor 1, the contents of the reactor 2 are kept under pressure then supplied to reduced the pressure, the flash steam thus emitted being directed to the third reactor, the latter having previously been emptied and then resupplied with sludge to be treated. The second phase lasts 60 nm.

During the third phase, the contents of the reactor 1 are kept under pressure then brought to atmospheric pressure, the flash steam thus emitted being directed to the second reactor, the latter having previously been emptied and then resupplied with sludge to be treated and live steam is injected in the third reactor. The third phase lasts 65 mn.

It will be noticed that between emptying a reactor and resupplying it, a rest time of around 5 mn to 10 mn is observed.

As is clearly evident from FIG. 2, the process according to the present invention has the advantage of enabling continuous distribution of the live steam coming from the boiler alternatively in the reactors 1, 2 and 3.

Figure 3:
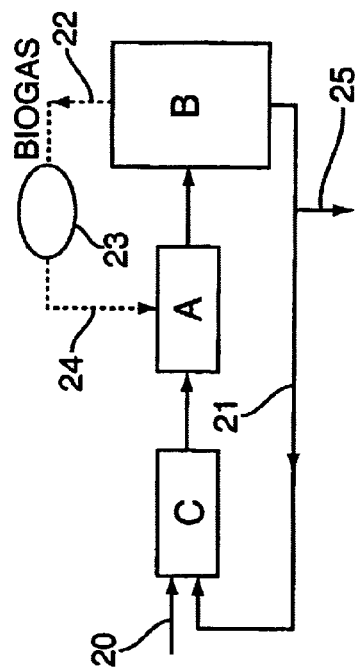
FIG. 3 illustrates a second embodiment of an installation for utilising the process according to the present invention.

With reference to FIG. 3, the installation illustrated in FIG. 1 and designated in its entirety by reference A can be combined with a mesophilic on thermophilic digestion unit designated by reference B and with a dehydration unit for sludge designated by reference C.

According to this embodiment, the excess sludge to be treated is conveyed via channel 20 to the dehydration unit C, then directed to the thermal hydrolysis unit such as described with reference to FIG. 1. Once it is hydrolysed, this sludge is routed to the mesophilic digester B (it is noted that in other embodiments this digester could also function in thermophilic mode). The biogas obtained during digestion is recovered at 22 to heat a boiler 23 which supplies, via the channel 24, the live steam necessary for operating the unit A. The sludge coming from the digester is then redirected to the top of the plant to the dehydration unit C. The strongly mineralises sludge residue is recovered at 25. This residue is fully hygienised and deodorized. Its volume, relative to the initial volume, is very low.

The resulting digested sludge can be dehydrated again to then be improved in agriculture, for example.

This sludge can also be sent to a thermal destruction process such as humid oxidation or such as incineration. The dimensions of the incineration ovens used in the latter case can be smaller than the size of those which would have to be used if the sludge in question had not undergone thermal hydrolysis.

The aim of the embodiments of the invention described here is not to reduce the scope of the latter. Numerous modifications can be added without departing from its scope. In particular it is noted that, in another embodiment, more than three reactors mounted in parallel can be used to enable not only continuous feed of live steam but also continuous supply and extraction of sludge. The duration of the various phases could also be selected in different ways.

What is claimed is:

1. A multi-phase method of treating sludge in a series of reactors, comprising:

In a first phase:
 directing sludge to a first reactor;
 directing live steam to a second reactor;
 retaining sludge in a third reactor, reducing the pressure in the third reactor and releasing flash steam from the third reactor to the first reactor;

In a second phase:
 directing sludge to the third reactor;
 directing live steam to the first reactor;
 retaining sludge in the second reactor, reducing the pressure in the second reactor and releasing flash steam from the second reactor to the third reactor; and In a third phase:
 directing sludge to the second reactor;
 directing live steam to the third reactor; and
 retaining sludge in the first reactor, reducing the pressure in the first reactor and releasing flash steam from the first reactor to the second reactor.

2. The method of claim 1 wherein the sludge is retained at a predetermined pressure and a predetermined temperature.

3. The method of claim 2 wherein the predetermined temperature is about 130° C.–200° C.

4. The method of claim 2 wherein the predetermined pressure is about 10 bar–20 bar.

5. The method of claim 1 wherein the sludge is maintained in each reactor for about 100 minutes–360 minutes.

6. The method of claim 1 further comprising digesting the sludge to produce a biogas and a digested sludge and using said biogas to generate at least a part of the live steam.

7. The method of claim 6 wherein digesting the sludge includes subjecting the sludge to an aerobic treatment.

8. The method of claim 6 wherein digesting the sludge comprises subjecting the sludge to mesophilic digestion.

9. The method of claim 6 wherein digesting the sludge comprises subjecting the sludge to thermophilic digestion.

10. The method of claim 6 wherein digesting the sludge comprises subjecting the sludge to thermophilic aerobic digestion.

11. The method of claim 6 further comprising mixing at least a part of the digested sludge with at least a part of the sludge directed to one of the reactors.

12. The method of claim 6 further comprising directing at least part of the digested sludge to an incineration unit.

13. The method of claim 6 further comprising directing at least part of the digested sludge to an oxidation unit.

14. The method of claim 1 wherein in the first phase, sludge is removed from the third reactor, in the second phase sludge is removed from the second reactor, and in the third phase sludge is removed from the first reactor.

15. The method of claim 1 wherein during each phase, flash steam is directed from only one of the reactors to either of the other two reactors.

16. The method of claim 1 further comprising thermo-compressing the flash steam emitted from at least one reactor with the live steam.

17. A method of treating sludge in a series of reactors in a multiphase process comprising:

in a first phase directing sludge into a first reactor, directing live steam into a second reactor that received sludge during a previous phase, and directing flash steam from only a third reactor to the first reactor and directing treated sludge from the third reactor; and repeating the first phase method for at least two additional phases where sludge is sequentially directed into the second and third reactors and wherein live steam is sequentially directed into the third and first reactors, and wherein flash steam is sequentially directed from the first and second reactors to the second and third reactors and treated sludge is sequentially removed from the first and third reactors.

18. The method of claim 17 wherein during each phase sludge is retained in at least one reactor and subjected to a temperature of about 130° C. to 200° C. for a selected time period.

19. The method of claim 18 wherein the selected time period is about 100 minutes to 360 minutes.

20. The method of claim 17 wherein during each of the three phases, sludge within one of the reactors is removed and wherein over the course of the three phases, sludge is removed from the first, second and third reactors.

21. The method of claim 17 wherein the sludge retained in at least one reactor during each phase of the process is subject to a pressure of about 10 bar–20 bar.

* * * * *